(12) United States Patent
Kato et al.

(10) Patent No.: US 10,902,112 B2
(45) Date of Patent: Jan. 26, 2021

(54) SYSTEM INCLUDING A HYPERVISOR

(71) Applicant: Sekisui House, Ltd., Osaka (JP)

(72) Inventors: Hidekazu Kato, Tokyo (JP); Shoi Egawa, Tokyo (JP)

(73) Assignee: Sekisui House, Ltd., Osaka (JP)

( * ) Notice: Subject to any disclaimer, the term of this patent is extended or adjusted under 35 U.S.C. 154(b) by 231 days.

(21) Appl. No.: 15/753,385

(22) PCT Filed: Aug. 25, 2016

(86) PCT No.: PCT/JP2016/074886
§ 371 (c)(1),
(2) Date: Feb. 19, 2018

(87) PCT Pub. No.: WO2017/034008
PCT Pub. Date: Mar. 2, 2017

(65) Prior Publication Data
US 2018/0239896 A1 Aug. 23, 2018

(30) Foreign Application Priority Data

Aug. 25, 2015 (JP) .................................. 2015-165785
Feb. 16, 2016 (JP) .................................. 2016-026955

(51) Int. Cl.
*G06F 21/53* (2013.01)
*G06F 9/46* (2006.01)
(Continued)

(52) U.S. Cl.
CPC ................ *G06F 21/53* (2013.01); *G06F 8/65* (2013.01); *G06F 9/441* (2013.01);
(Continued)

(58) Field of Classification Search
None
See application file for complete search history.

(56) References Cited

U.S. PATENT DOCUMENTS 8,285,987 B1 * 10/2012 Kimball .................. G06F 21/14
713/164
8,522,322 B2 8/2013 Wishman et al.
(Continued)

FOREIGN PATENT DOCUMENTS

CN 102291428 A 12/2011
CN 103119553 A 5/2013
(Continued)

OTHER PUBLICATIONS

Wikipedia ("System on Chip", found on https://web.archive.org/web/20131116000321/https://en.wikipedia.org/wiki/System_on_a_chip, author unknown, Nov. 2013).*

(Continued)

*Primary Examiner* — Piotr Poltorak
(74) *Attorney, Agent, or Firm* — Blank Rome LLP

(57) ABSTRACT

There is provided a system (1) comprising: a processing unit (11) equipped with execution modes including a non-secure mode (3) in which access to a protected region of a memory is prohibited by a support function (12) and a secure mode (2) in which access to the protected region is permitted; and a hypervisor (20) which runs in the secure mode. The hypervisor includes: a first setting unit (23) for setting a first operation condition (21), which includes enabling a first OS (30) running in the secure mode to access the protected region and the unprotected region of the memory; and a second setting unit (24) for setting a second operation condition (22a), which includes enabling a second OS (41) running in the non-secure mode to access the unprotected region, using the support function to prevent the second OS (41) from accessing the secure region, and enabling a transition to the secure mode by accessing of the second OS to a first device shared with the first OS.

12 Claims, 7 Drawing Sheets

(51) Int. Cl.
*G06F 12/14* (2006.01)
*G06F 8/65* (2018.01)
*G06F 9/4401* (2018.01)
*G06F 9/455* (2018.01)

(52) U.S. Cl.
CPC ............ *G06F 9/45558* (2013.01); *G06F 9/46* (2013.01); *G06F 12/14* (2013.01); *G06F 2009/45587* (2013.01); *G06F 2221/033* (2013.01)

(56) References Cited

U.S. PATENT DOCUMENTS

| | | | |
|---|---|---|---|
| 8,656,482 B1* | 2/2014 | Tosa | H04L 63/08 713/153 |
| 8,739,177 B2 | 5/2014 | Qian et al. | |
| 9,043,594 B2* | 5/2015 | Sutton, II | G06F 12/1458 713/164 |
| 9,191,202 B2 | 11/2015 | Isozaki et al. | |
| 10,269,167 B1* | 4/2019 | Imbrogno | G06T 1/20 |
| 2001/0014141 A1* | 8/2001 | Kraeutler | H04Q 11/0471 379/1.03 |
| 2002/0184404 A1* | 12/2002 | Lerman | G06F 5/10 719/318 |
| 2004/0153593 A1* | 8/2004 | Watt | G06F 9/466 710/200 |
| 2004/0153672 A1* | 8/2004 | Watt | G06F 9/3012 726/22 |
| 2004/0153807 A1* | 8/2004 | Watt | G06F 9/4812 714/35 |
| 2005/0060481 A1* | 3/2005 | Belonoznik | G06F 13/385 710/315 |
| 2006/0146057 A1* | 7/2006 | Blythe | G06F 9/45537 345/506 |
| 2007/0011272 A1* | 1/2007 | Bakke | G06F 9/5027 709/217 |
| 2008/0092145 A1* | 4/2008 | Sun | G06F 12/1441 719/312 |
| 2008/0168266 A1* | 7/2008 | Sita | G06F 21/10 713/2 |
| 2010/0031325 A1* | 2/2010 | Maigne | G06F 9/45533 726/4 |
| 2011/0314469 A1* | 12/2011 | Qian | H04L 49/9057 718/1 |
| 2012/0072734 A1 | 3/2012 | Wishman et al. | |
| 2012/0216189 A1* | 8/2012 | Kalbarga | G06F 9/45558 718/1 |
| 2012/0297177 A1* | 11/2012 | Ghosh | G06F 21/53 713/2 |
| 2013/0219192 A1* | 8/2013 | Park | G06F 21/602 713/190 |
| 2013/0219499 A1* | 8/2013 | Park | G06F 21/57 726/23 |
| 2014/0298026 A1* | 10/2014 | Isozaki | H04L 9/0825 713/171 |
| 2015/0052616 A1* | 2/2015 | Hutchison | G06F 21/53 726/27 |
| 2015/0127866 A1* | 5/2015 | Zeng | G06F 13/26 710/264 |
| 2016/0282927 A1* | 9/2016 | Adams | G06F 13/24 |
| 2017/0220373 A1* | 8/2017 | Mooring | G06F 9/45533 |

FOREIGN PATENT DOCUMENTS

| | | |
|---|---|---|
| JP | 2012-003747 A | 1/2012 |
| JP | 2013-161479 A | 8/2013 |
| JP | 2013-537343 A | 9/2013 |
| JP | 2014-191509 A | 10/2014 |
| KR | 10-2011-0139151 A | 12/2011 |
| WO | WO-2012-039971 A2 | 3/2012 |

OTHER PUBLICATIONS

International Search Report for PCT/JP2016/074886, dated Nov. 8, 2016, 2 pages.
International Preliminary Report on Patentability for PCT/JP2016/074886 dated Feb. 27, 2018, 11 pages.

* cited by examiner

SYSTEM INCLUDING A HYPERVISOR

RELATED APPLICATIONS

This application is a national phase of PCT/JP2016/074886, filed on Aug. 25, 2016, which claims the benefit of Japanese Application No. 2015-165785, filed on Aug. 25, 2015 and Japanese Patent Application No. 2016-026955, filed on Feb. 16, 2016. The entire contents of those applications are hereby incorporated by reference.

TECHNICAL FIELD

The present invention relates to a system including a hypervisor.

BACKGROUND ART

Japanese Laid-Open Patent Publication No. 2013-161479 (hereinafter, "Patent Literature 1") discloses a technology that provides a data processing apparatus and method that use a secure domain and a low-security domain. The data processing apparatus disclosed in Patent Literature 1 includes a processing circuit with a domain where operations are secure and a domain where operations are in low-security. When operating in the secure domain, the processing circuit is capable of accessing data that cannot be accessed in the low-security domain. In response to the execution of a control flow changing instruction, the processing switches to a program instruction at a target address. Domain selection is implemented to decide a selected domain where the processing circuit is to operate for the instruction at the target address. Domain checking may be implemented to check which domain or domains is/are permitted to become the selected domain decided by the domain selection. A domain checking error occurs when a selected domain selected by the domain selection is not a permitted selected domain.

DISCLOSURE OF INVENTION

For a data processing apparatus equipped with a function (support function, assistance function, helper, supporting facility) that supports a secure domain (secure mode, secure world) and a low-security domain (low-security mode, low-security world, normal world, typically a non-secure mode) on a hardware level, there is demand for the provision of a more secure virtualization environment.

One aspect of the present invention is a system including: a processing unit including a support function. The support function that is configured to prohibit access to a protected region of a memory. The memory includes the protected region (protected area) and an unprotected region (unprotected area). The processing unit is equipped with execution modes (or "execution environments") including a low security mode (or "low security environment"), typically a non-secure mode, in which access to the protected region is prohibited by the support function and a secure mode (or "secure environment") in which access to the protected region is permitted. The system also includes a hypervisor that runs in the secure mode of the processing unit. The hypervisor includes: a first setting unit that is configured to set a first operating condition that includes enabling a first OS running in the secure mode to access the protected region and the unprotected region; a second setting unit that is configured to set a second operating condition that includes enabling a second OS running in the low security mode to access the unprotected region, disabling the second OS from accessing the protected region by using the support function, and enabling a transition to the secure mode by an accessing of the second OS to a first device shared with the first OS; and an emulation unit that is configured to provide the first device to the second OS through virtualization.

In this system, the hypervisor runs (operates) in the secure mode that provides a secure execution environment (or "secure world") where attacks from the outside are fundamentally prevented. Accordingly, there is no exposure to interference or attacks from a second OS, such as a rich OS, that operates in the low security mode and a more secure virtualization environment (or "virtual environment") can be provided by the hypervisor that runs in the secure mode.

On the other hand, if it becomes necessary to virtualize the operations of the second OS that runs in the low security mode, the processing unit will switch from the low security mode to the secure mode, which causes a decreasing of processing speed. In this system, the hypervisor includes the first setting unit that sets the first operating condition (first configuration) of the first OS that operates in the secure mode and the second setting unit that sets the second operating condition (second configuration) of the second OS that operates in the low security mode, and the hypervisor operates in the secure mode (secure environment) and sets the operating condition of the second OS that runs (operates) in the low security mode.

The second operating condition enables access to the unprotected region, disables access to the protected region using the support function, and enables a transition to secure mode by accessing a first device that is shared with the first OS, with the hypervisor providing, in the secure mode, the first device to the second OS by way of virtualization by the emulation unit. With this second operating condition, the second OS that runs in the low security mode becomes able to access the unprotected region of the memory without a transition to secure mode and able to access devices that are not shared with the OS that operates in the secure mode without a transition to secure mode. Accordingly, for the second OS that runs in the low security mode, the number of times of transitions to secure mode during operating is reduced, which makes it possible to suppress a drop or decreasing in processing speed due to virtualization. For the first OS that runs in the secure mode, accesses to the first device that is shared with the second OS are virtualized in the secure mode, which makes it possible to suppress a drop or decreasing in processing speed due to transitions in mode. This means that it is possible to run OSes, such as a real-time OS (RTOS), where a decreasing of response speed may cause a problem, with high reliability in the secure mode.

The first operating condition may include disabling access to an unprotected device including a low security computer network and the second operating condition may include enabling access to the unprotected device. Using the first operating condition, the hypervisor is capable of disabling access by the first OS that operates in the secure mode to unprotected resources, such as unprotected devices that are important from the view point of security reasons, which makes it possible to further ensure that the first OS is secure. According to the first condition and the second condition, it is possible for example to fix (or "limit") accesses to a computer network, to the second OS only.

According to the operating conditions of the OSes that are set by the hypervisor, it is possible to limit the devices that can be accessed on an OS-by-OS basis. From the viewpoint of the devices, the hypervisor is capable of setting a virtual environment (or operating environment for each OS) so that devices are assigned to the OSes one by one out of the plurality of OSes that are operating and is accessed by only one of the OSes to which the device has been assigned. Accordingly, it is possible to fix resources (devices) for each OS, to avoid the possibility of sharing of devices by fixing resources in this way, and to reduce the number of occasions where the hypervisor emulates a shared device, which reduces the number of times the hypervisor has to operate. This means that in the present system, security during virtualization can be maintained by the hypervisor running in the secure mode and it is also possible to suppress a reduction in processing speed of an OS that runs in the low security mode.

The hypervisor runs in the secure mode. The hypervisor may include an OS switching unit that switches between a plurality of OSes including the first OS and the second OS, and the OS switching unit may include a unit that is configured to store operating conditions of the plurality of OSes and contexts of the plurality of OSes in the protected region. When switching OS, the context (or state of an OS) is saved with high security, which makes it possible to reliably switch between a plurality of OSes.

Examples of support functions that support secure mode are the TrustZone hardware architecture (TZ architecture) provided by ARM, the VZ architecture provided by MIPS Technologies, and the Virtualization Technology (or "VT") architecture provided by Intel Corp. Examples of the second OS include Linux (registered trademark) and rich, widely applicable OSes with high functionality, such as Android. One example of a secure first OS (or "secure OS" in this specification) is a real-time OS that supports embedded control software.

The hypervisor in this system may additionally include an OS start preparing unit (launch preparing unit). Since the hypervisor operates in secure mode, it is possible for the OS start preparing unit to include: a first authentication unit that is configured to authenticate firmware of the second OS stored in the protected region using authentication information stored in the protected region; and a loading unit that loads (develops, maps, or deploys) the firmware of the authenticated second OS stored in the protected region as an instance for execution purposes in a boot region of the unprotected region. The hypervisor is capable of starting the second OS using firmware of the second OS that has been authenticated using authentication information stored in the protected region that cannot be accessed by (or seen by) the second OS that runs in the low security mode. This means that it is possible to prevent the firmware of the second OS from being modified by an OS, such as the second OS, that operates in the low security mode, or by applications that run in the low security mode.

The system may further include an updating unit that runs in the secure mode. The hypervisor that runs in the secure mode may include the updating unit. The updating unit may include: a second authentication unit that is configured to authenticate firmware for updating purposes that was downloaded into the unprotected region using the authentication information stored in the protected region; and a storage unit that is configured to store the authenticated firmware for updating purposes that was downloaded into the unprotected region into the protected region. An application operates on the second OS can download firmware for updating purposes and store it into the unprotected region of the memory. In the updating unit operates in secure mode, after the second authentication unit authenticate the firmware for updating purposes that has been stored in the unprotected region, the storage unit stores the firmware for updating purposes into the protected region. With this process, it is possible to store firmware, which has been authenticated using the authentication information stored in the protected region, into the protected region and to use the firmware in a state where the firmware is stored in the protected region. This means that it is possible to prevent the firmware for updating purposes from being modified by an OS, such as the second OS, that runs in the low security mode, or by an application that runs on the second OS.

The first operating condition and the second operating condition may include an operating condition of a shared memory region (memory area) set in the unprotected region. By setting the shared memory region in the unprotected region in the memory, it is possible to reduce the number of times the hypervisor intervenes when the first OS and the second OS access the shared memory region, which makes it possible to reduce the time required by inter-OSes (OS-to-OS) communication. The operating condition of the shared memory region may include a transition to the secure mode when the second OS writes into the shared memory region, the hypervisor may include a unit that notifies the first OS of a write into the shared memory region, and the first OS may include a unit that notifies, by way of an interrupt, the second OS of a write into the shared memory region. Since the first OS can notify the second OS without the hypervisor intervening, it is possible to continue real-time processing without waiting for a reply from the hypervisor.

The system may also be equipped with a system on chip on which the memory and the processing unit are mounted. The system may also include an application that runs on the second OS and an apparatus that is controlled by the application. Via the hypervisor, it is possible to access a wide variety of devices including unprotected devices, and applications that control a wide variety of apparatuses can run on the second OS. These apparatuses may be industrial apparatuses such as printers, printing devices, bookbinding apparatuses, and machining equipment, may be devices for household use such as refrigerators, washing machines, and microwave ovens, or may be control apparatuses for engines or automobiles.

Another aspect of the present invention is a method of controlling a plurality of OSes in a system including a processing unit that includes a support function. The supporting function prohibits access to a protected region of a memory that includes the protected region and an unprotected region. The processor is equipped with execution modes including a low security mode in which access to the protected region is prohibited by the support function and a secure mode in which access to the protected region is permitted. The system also includes a hypervisor that operates in the secure mode of the processing unit, and the method includes the following steps.

1. Setting, using the hypervisor, a first operating condition that includes enabling a first OS running in the secure mode to access the protected region and the unprotected region.
2. Setting, using the hypervisor, a second operating condition that includes enabling a second OS running in the low security mode to access the unprotected region, disabling the second OS from accessing the protected region by using the support function, and enabling a transition to the secure mode by an accessing of the second OS to a first device shared with the first OS.
3. Providing, using the hypervisor, the first device to the second OS through virtualization.

The method may further include preparing, using the hypervisor, for starting an OS, wherein the preparing for starting the OS may include: authenticating firmware of the second OS stored in the protected region using authentication information stored in the protected region; and loading the authenticated firmware of the second OS stored in the protected region as an instance for execution purposes in a boot region of the unprotected region.

The method may further include authenticating, using an updating unit that runs in the secure mode, firmware for updating purposes that has been downloaded into the unprotected region using the authentication information stored in the protected region and storing the authenticated firmware for updating purposes that was downloaded into the unprotected region into the protected region.

The method may further include transitioning to the secure mode when the second OS writes into a shared memory region set in the unprotected region, the hypervisor notifying the first OS of a write into the shared memory region, and the first OS notifying, by way of an interrupt, the second OS of a write into the shared memory region.

Yet another aspect of the present invention is a program (or "program product") that enables control of a plurality of OSes in a system including a processing unit that includes a support function. The supporting function is configured to prohibit access to a protected region of a memory that includes the protected region and an unprotected region. The processing unit is equipped with execution modes including a low security mode in which access to the protected region is prohibited by the support function and a secure mode in which access to the protected region is permitted. It is possible to provide this program (or "program product") by recording on a computer-readable recording medium. The program includes an instruction that causes the processing unit to run a hypervisor in the secure mode, and the hypervisor executes: setting of a first operating condition that includes enabling a first OS running in the secure mode to access the protected region and the unprotected region; setting of a second operating condition that includes enabling a second OS running in the low security mode to access the unprotected region, using the support function to disable the second OS from accessing the protected region, and enabling a transition to the secure mode by an accessing of the second OS to a first device shared with the first OS; and providing the first device to the second OS through virtualization.

DETAIL DESCRIPTION OF THE INVENTION

Figure 1:
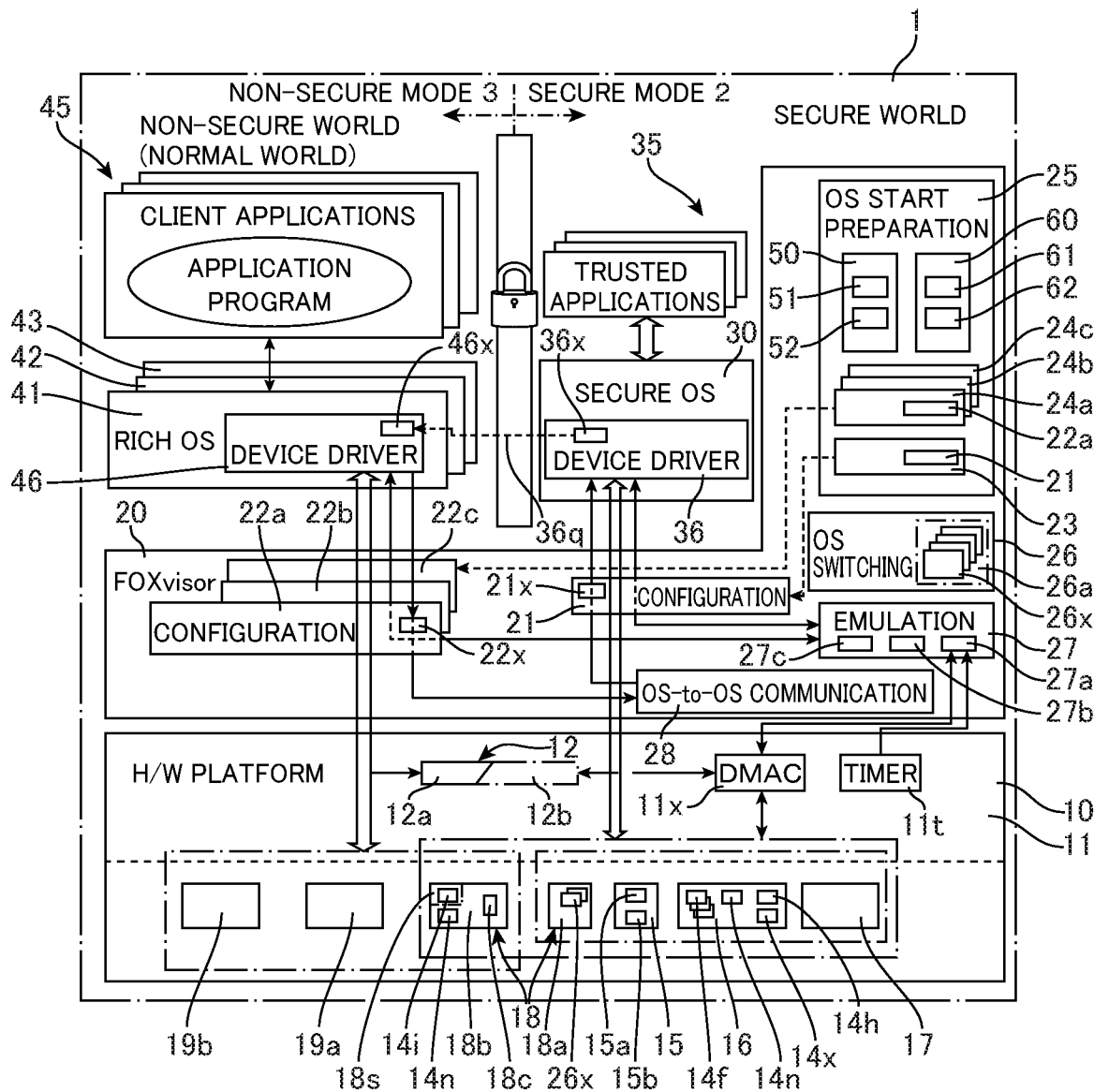
FIG. 1 is a block diagram depicting one example of an embedded system including a hypervisor.

FIG. 1 shows one example of a system equipped with a hypervisor. This system 1 is a computer system embedded in a household appliance, industrial machinery, a printer, a car, or the like, and is typically an SoC (System of Chip). The system 1 includes a hardware platform 10 including a processor unit 11, a hypervisor 20 that runs or operates on the hardware platform 10, and a secure OS (first OS) 30 and rich OSes (second OSes) 41 to 43 that run on a virtualization environment provided by the hypervisor 20.

The processor unit 11 provides a plurality of execution modes (execution environments), and in the present embodiment, two execution modes are included in the plurality of execution modes. One of the execution modes is a secure mode 2 realized by a support function (memory protecting function, memory protecting architecture) that sets a protected region in a memory and prohibits access to the protected region and another execution modes is a low-security mode 3 (hereinafter also referred to as the "non-secure mode", or "normal mode") that has a lower level of protection than the secure mode 2. In the non-secure mode 3, access to the protected region of the memory is prohibited by the support function of the processor unit 11.

The system 1 has a trusted application group 35 that run on the secure OS 30 running in the secure mode 2 (i.e., in the "secure world") and a client application group 45 that run on the rich OSes 41 to 43 running in the non-secure mode 3 (i.e., in the "non-secure world" or "normal world"). OSes such as the rich OSes 41 to 43 that run in the non-secure mode 3 may be referred to below as "non-secure OSes".

The functions of an embedded system that can configure an IoT (Internet of Things) setup or system are defined by system software that include the OS (Operating System) or OSes and applications that run on the OS or OSes. The hypervisor 20 can construct or supply environments for a plurality of OSes operate. The hypervisors "FOXvisor" and "FEXEROX" provided by the present applicant are bare metal-type ("Type 1") hypervisors that can separate a plurality of OSes using a support function or supporting architecture (mechanism) 12 that the processor (processor unit) 11 has as hardware.

For a processor in which ARM IP is incorporated, the support function is implemented by TrustZone (hereinafter referred to as a "TZ architecture"), for a processor in which MIPS IP is incorporated, the support function is implemented by a VZ architecture, and for an Intel processor, the support function is implemented by a VT architecture. The support function may include a virtualization extension function, such as the virtualization extension and LPAE (Large Physical Address Extension) of a processor of ARM IP.

The following description refers to the processor unit 11 that includes the TZ architecture 12 as a support function (or "security support function" or "secure supporting mechanism"). With the TZ architecture 12, it is possible to configure an environment in which it is possible to separate a memory space 12a of a normal world and a memory space 12b of a secure world so that the memory space 12b of the secure world cannot been seen or accessed by the normal world (i.e., access is prohibited). In addition, for the processor unit 11, resources including peripheral devices (peripheral buffers) and registers are mapped into a memory space. This means that by using the TZ architecture 12, it is possible to trap accesses to specified addresses of resources including devices and to transition to secure mode 2.

Figure 2:
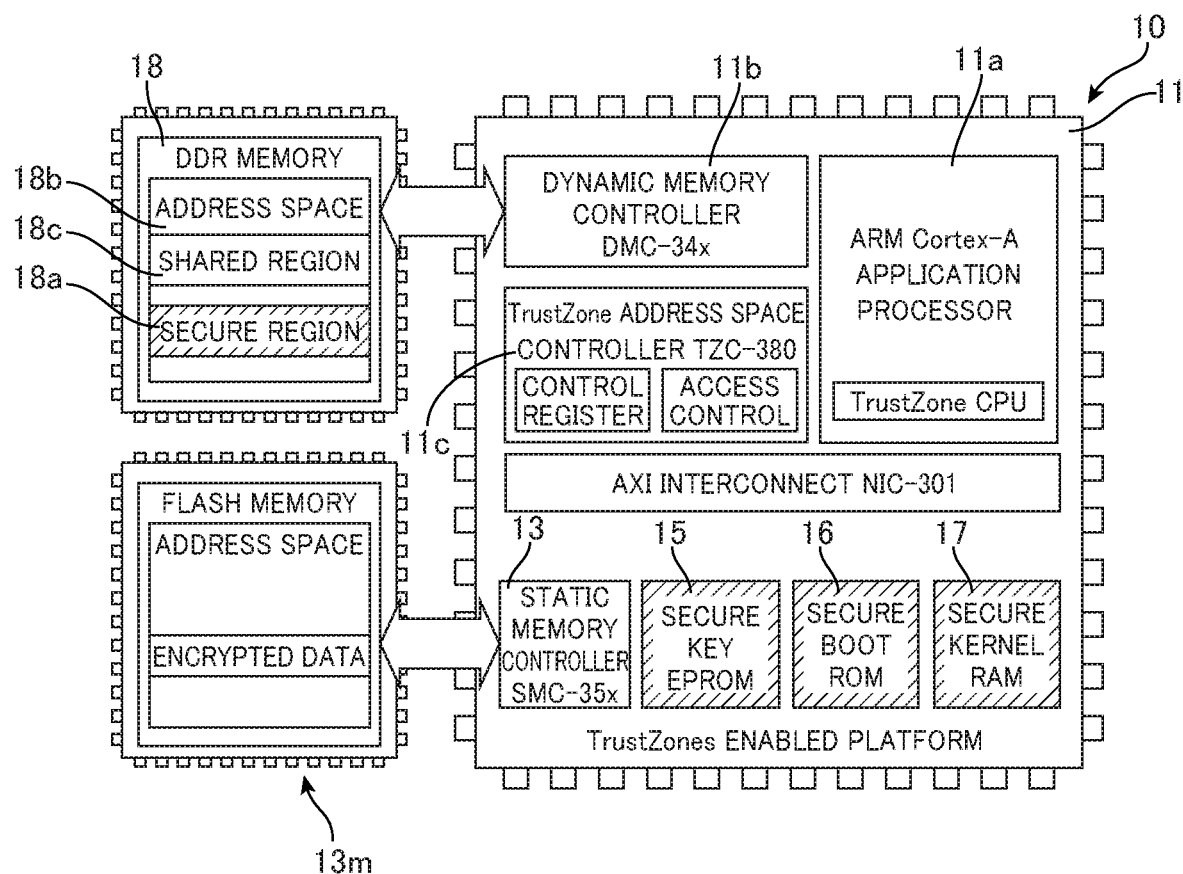
FIG. 2 depicts one example of a platform including a TZ architecture.

FIG. 2 depicts the configuration of the platform (SoC) 10 that can include TrustZone. The platform 10 includes the processor 11 that is equipped with the security support function, a general-purpose flash memory 13m, and a DDR memory that is a general-purpose RAM 18. The processor unit 11 includes a CPU 11*a* equipped with a function that controls the TZ architecture, a controller 11*b* for the DDR memory, a controller 11*c* that controls an address space of the TZ architecture, a secure key EPROM 15, a secure boot ROM 16, a secure kernel RAM 17, and a static memory controller 13. In the platform 10, a protected region (or "secure region") 18*a* out of an address space in the DDR memory 18 that is a general-purpose RAM is a region that, by the TZ architecture 12, cannot be accessed in the non-secure mode (normal mode) 3. The secure key EPROM 15, the secure boot ROM 16, and the secure kernel RAM 17 are also protected regions and so are regions that cannot be accessed in the non-secure mode 3 due to (by using) the TZ architecture 12. On the hardware platform 10, a shared region 18*c* that can be commonly accessed by a plurality of OSes is set in an unprotected region (non-secure region) 18*b* out of the address space region of the DDR memory 18.

Returning to FIG. 1, the hypervisor 20 includes an OS start preparing unit (launch preparing unit) 25 that performs start preparation for a plurality of OSes that run (operate) under the control of the hypervisor 20, an OS switching unit 26 that performs switching between OSes such as when the resources of the processor unit 11 are insufficient, an emulation unit 27 that provides functions as virtual devices, and an OS-to-OS communication unit 28 that supports communication between OSes (inter-OSes communication). When the system 1 is started or booted, the hypervisor 20 is launched by a boot loader of the processor unit 11 loading firmware (i.e., a program or program product) 14*h* that is stored in the secure boot ROM 16.

The OS start preparing unit 25 includes a first setting unit 23 that sets, when the first OS (secure OS) 30 that runs in the secure mode 2 is launched, a first operating condition (first configuration) 21 that includes enabling the secure OS 30 to access the protected region and the unprotected region of the memory. The OS start preparing unit 25 also includes second setting units 24*a* to 24*c* that set, when the second OSes (rich OSes, non-secure OSes) 41 to 43 that run in the non-secure mode 3 are launched, second operating conditions (second configurations) 22*a* to 22*c* that enable the non-secure OSes 41 to 43 to access the unprotected region and make it impossible, using the TZ mechanism 12 that is the support function, for the non-secure OSes 41 to 43 to access the secure region. The second configurations 22*a* to 22*c* also include enabling a transition to the secure mode 2 due to an access to a device (first device) that is shared with the secure OS 30.

More specifically, the first configuration 21 assigns secure resources (devices) of the hardware platform 10 corresponding to device drivers 36 of the secure OS 30 to make it possible to access such resources. The second configurations 22*a* to 22*c* assign non-secure resources (devices) of the hardware platform 10 corresponding to respective device drivers 46 of the non-secure rich OSes 41 to 43 to make it possible to access such resources.

Accordingly, the secure OS 30 that is started after the first configuration 21 has been applied by the hypervisor 20, can provide a secure operating environment to the applications 35 that run on the secure OS 30. Also, the non-secure rich OSes 41 to 43 that are started after the second configurations 22*a* to 22*c* have been applied by the hypervisor 20, can provide operating environments that are not secure but have wide general-purpose applicability to applications 45 that run on the rich OSes 41 to 43. Switching may be performed between the secure OS 30 and the rich OSes 41 to 43, and if the processor unit 11 is multicore, all or some of the secure OS 30 and the rich OSes 41 to 43 may run in parallel. The rich OSes (second OSes) 41 to 43 that are examples of non-secure OSes are general-purpose OSes, such as Linux (registered trademark) and Android, that are compatible with a wide variety of applications.

The first configuration 21 assigns the secure key EPROM 15 that is a secure region (protected region) in memory, the secure boot ROM 16, the secure kernel RAM 17, and a secure region 18*a* of the DDR memory 18 that is a general-purpose RAM to the secure OS 30 to enable access. The first configuration 21 further assigns a non-secure region (unprotected region) 18*b* of the DDR memory 18 to the first OS 30 to enable access to the non-secure region 18*b*. The device drivers 36 of the secure OS 30 include a driver 36*x* that makes communication between OSes (OS-to-OS communication) possible and the first configuration 21 includes an operation condition 21*x* including mapping information for the shared region 18*c* for the OS-to-OS communication assigned to the driver 36*x*.

The first configuration 21 may include a configuration that does not assign non-secure resources, such as a non-secure network device 19*a* and a general-purpose interface device 19*b*, to the secure OS 30 and prohibits and does not permit direct access to non-secure resources from the secure OS 30 and the trusted applications 35 that run on the secure OS 30. The first configuration 21 may also include an operation condition that indirectly accesses non-secure resources via a procedure, such as authentication, that ensures a predetermined level of security using a virtual device provided by the hypervisor 20.

One out of the second configurations 22*a* to 22*c*, for example, the second configuration 22*a*, assigns a fixed address region of the non-secure region 18*b* in the DDR memory 18, the network device 19*a*, and a specified device included in the general-purpose interface devices 19*b* in a fixed condition to the general-purpose and non-secure rich OS 41, to make it possible for applications 45 that run on the non-secure OS 41 to access these devices in the non-secure mode 3, that is, without a transition to the secure mode 2.

The second configuration 22*a* also includes a configuration, by accessing devices (first devices) that are shared with the secure OS 30, for example, a DMAC 11*x* and a timer unit 11*t*, enabling a transition to the secure mode 2. The rich OS 41 accesses such devices as virtual devices provided by the hypervisor 20 that is running in the secure mode 2. On trapping an access by the rich OS 41 to a specified address that accesses the shared device, the processor unit 11 transitions to the secure mode 2, then the emulation unit 27 of the hypervisor 20 analyzes the device to be accessed, the register being accessed, and the state of the rich OS 41 that is a guest OS, and decides the content to be emulated.

The device drivers 46 of the rich OS 41 include a driver 46*x* that enables the OS-to-OS communication, and the second configuration 22 includes an operating condition 22*x* including mapping information for the shared memory 18*c* used for the OS-to-OS communication that is assigned to the driver 46*x*.

The second configuration 22*a* provides a condition (environment) that operates in a normal world (non-secure mode). By setting the second configuration 22*a*, it is possible, by way of the TZ architecture 12, to access the non-secure region 18*b* of the DDR memory 18 using the memory space 12*a* for the normal world. However, by the TZ architecture 12, addresses such as the secure region 18*a* of the memory space 12*b* of the secure world cannot be seen to the rich OS 41, so that the secure key EPROM 15, the secure boot ROM 16, the secure kernel RAM 17, and the secure region 18*a* of the general-purpose RAM cannot be seen from the rich OS 41 and from the client applications 45 that run on the rich OS 41, which means that accesses to these regions are not permitted.

The OS start preparing unit 25 further includes a secure boot unit 50 and an updating unit (secure updating unit) 60. The secure boot unit 50 includes a first authentication unit 51, which authenticates the firmware 14f of the second OS 41 stored in the secure boot ROM 16 of the protected region using authentication information 15a stored in the secure key EPROM 15 of the protected region, and a loading unit 52, which loads or develops (with decompressing or extracting) the firmware 14f of the second OS that has been stored in the secure boot ROM 16 of the protected region and has been authenticated in a boot region 18s in the non-secure region 18b that is an unprotected region of the DDR memory 18 to form an instance 14i for execution purposes.

When the instance 14i for execution purposes has been prepared, the hypervisor 20 sets the second configuration 22a for starting the second OS 41 and switches to the non-secure mode 3. The second OS 41 is launched by the boot loader of the processor unit 11 loading the instance 14i for execution purposes that has been formed in the non-secure region 18b that is an unprotected region.

If the processor unit 11 is multicore, it is possible to switch the execution mode of a specified, one of the CPU cores to the non-secure mode 3 and start the second OS 41 using the second configuration 22a. Accordingly, inside the processor unit 11, it is possible for the secure OS 30 that runs in the secure mode 2 and the second OS (rich OS, non-secure OS) 41 that runs in the non-secure mode 3 to run in parallel. When the processor unit 11 is single core or the resources are insufficient for running a plurality of OSes in parallel, it is possible to switch modes and start and run the secure OS 30 and the non-secure OS 41 one after another or in order. The other OSes 42 and 43 also operate in parallel or one after another according to the processor type.

In either of the above cases, the second OS 41 that runs in the non-secure mode 3 cannot see or write into the secure boot ROM 16 in which the original firmware 14f for starting the second OS 41 is stored. Accordingly, it is possible to prevent the non-secure OS 41 from being modified due to any cause.

The updating unit 60 includes a second authentication unit 61 and a storage unit 62. The second authentication unit 61 authenticates using the authentication information 15b stored in the secure key EPROM 15 of the protected region the firmware 14n for updating the non-secure rich OS that has been downloaded into the non-secure memory region 18b of the unprotected region. The storage unit 62 stores the firmware 14n for updating purposes that was downloaded into the non-secure memory region 18b and authenticated into the secure boot ROM 16 of the protected region. When the authenticated firmware 14n is stored into the secure boot ROM 16 or after storage, by replacing the previous firmware 14f with the newly downloaded and authenticated firmware 14n for updating purposes, it is possible to securely update the firmware 14f for booting the non-secure OS 41. It is also possible to securely update the firmware of the other OSes in the same way.

In the secure mode 2 in which the hypervisor 20 runs, the updating unit 60 is capable of authenticating the firmware 14n for updating purposes that has been downloaded by the second OS 41 before storage in the memory 16 used for a secure boot in a secure environment using the secure authentication information 15b that is stored in the secure memory 15 in a state where the authentication information 15b cannot be seen or written by the second OS 41. Accordingly, even when firmware that includes malicious code has been downloaded, it is possible to confirm the firmware in a secure state before storage into the memory 16 used for booting, which makes it possible to exclude firmware that includes malicious code.

The OS switching unit 26 includes a unit 26a that stores operation conditions (or "configurations") of the plurality of OSes and contexts 26x of the plurality of OSes in a protected region in memory, for example, the secure region 18a in the DDR memory 18. A context 26x is information indicating the running state of the corresponding OS and more specifically includes the content of the registers of the respective CPU cores. As one example, when switching from the secure OS 30 to the non-secure OS 41, in the secure mode 2 in which the hypervisor 20 runs, the OS switching unit 26 acquires the content of the registers of the CPU core on which the secure OS 30 was running, generates the context 26x, and stores the context 26x together with the configuration 21 of the secure OS 30 in the protected region 18a.

In addition, the OS switching unit 26 loads the context 26x of the non-secure OS 41 that was stored (i.e., temporarily saved) in the protected region 18a and sets the contents of the registers in each CPU core based on the loaded context 26x. After this, the OS switching unit 26 sets the configuration 22a and sets a program counter for restarting the non-secure OS 41. The processor unit 11 can restart the non-secure OS 41 by transitioning to the non-secure mode 3 and starting processing from the set program counter. This is also the case when switching to the other OSes. With the hypervisor 20, even when switching between OSes that run in the non-secure mode 3, by transiting and switching OSes in the secure mode 2, it is possible to store a context 26x in the protected region 18a. Accordingly, even when an OS is running in the non-secure mode 3, it is possible to prevent tampering with the state of another OS that has been temporarily saved and to improve the reliability of processing by the processor unit 11 and the system 1.

In the secure mode 2, the OS-to-OS communication unit 28 supports communication between OSes that is performed based on the operation conditions 21x and 22x for OS-to-OS communication that are respectively included in the first configuration 21 and the second configuration 22a. Since the shared memory region 18c set by the operation conditions 21x and 22x is inside the unprotected region 18b, the shared memory region 18c is also capable of being accessed by the secure OS 30 that runs in the secure mode 2 and the non-secure OS 41 that runs in the non-secure mode 3 without a transition between modes. The operation condition 22x included in the second configuration 22a includes a transition to the secure mode 2 when the non-secure OS 41 writes into the shared memory region 18c. After the transition to the secure mode 2, the hypervisor 20 analyzes the trapped condition and notifies the secure OS 30 that the OS-to-OS communication unit 28 has written into the shared memory region 18c. OS-to-OS communication is realized by the secure OS 30 accessing (reading out) the shared memory region 18c.

When the device driver 36x provided in the secure OS 30 for OS-to-OS communication has written into the shared memory region 18c, the device driver 36x can give notification from the secure mode 2 to the non-secure mode 3 by way of an interrupt, if the non-secure OS 41 is running in parallel, the non-secure OS 41 will be notified by an interrupt 36q. The non-secure OS 41 can get OS-to-OS communication by accessing (reading out) the shared memory region 18c in the non-secure mode 3. It is also possible to realize inter-OSes communication by providing the shared memory region 18c in the protected region and fully virtualizing the communication using the hypervisor 20. However, by providing the shared memory region 18c in the unprotected region 18b, it is possible to suppress the extent to which the hypervisor 20 handles processing relating to inter-OS communication, and to reduce the processing time required for OS-to-OS communication. In addition, by having the secure OS 30 give notification using an interrupt, it becomes unnecessary to wait for the hypervisor 20 to indicate the completion of notification. Accordingly, it is possible to eliminate a factor that would hinder real-time response by the secure OS 30.

The emulation unit 27 that provides functions as virtual devices at the hypervisor 20 is equipped with three patterns 27a, 27b, and 27c as virtual devices. The first pattern 27a is the pattern where real devices are shared. In this pattern 27a, controls performed over virtual devices respectively provided in a plurality of OSes to the shared one real device are arbitration by the hypervisor 20 to achieve shared controlling of the shared real device.

The second pattern 27b is addition of functionality. In this pattern 27b, the hypervisor 20 provides the functions of nonexistent devices to a plurality of OSes (guest OSes) in the form of virtual devices. These functions, which correspond to OS-to-OS communication and a virtual network, are provided by the hypervisor 20 without real hardware being present.

The third pattern 27c is enhancement of functionality. In this function enhancement pattern 27c, functions are added to a given device by the hypervisor 20. One example is a "virtual serial bus". Data that a guest OS has transmitted to a virtual serial bus can be converted to TCP/IP by the hypervisor 20 or another guest OS and transmitted on a network. Data transmission in the opposite direction is also possible, with the hypervisor 20 making it possible for TCP/IP data that has been sent from a network to be read out by a guest OS as data received from a virtual serial bus. Serial transmission of data by way of a virtual serial bus to the hypervisor 20 that performs conversion to and from TCP/IP can be performed using OS-to-OS communication as a specific example.

Among RTOS and simple embedded OSes that can be implemented as the secure OS 30, there are many OSes that are not equipped with complex functions like TCP/IP. By having the hypervisor 20 or another guest OS that has a TCP/IP function convert inputs and outputs on a virtual serial bus to TCP/IP inputs and outputs, it becomes possible to implement a network-compliant system without having to upgrade an OS that is not equipped with complex functions like TCP/IP.

In this system 1, the hypervisor 20 that provides virtualization functions such as OS start preparation, OS switching, OS-to-OS communication, and virtual devices is run in the secure mode 2. Accordingly, it is possible to execute virtualization processing on the secure side, particularly, virtualization processing related to the OS 30 that runs on the secure side and the guest OS 41 that runs on the non-secure side can be executed on the secure side, which makes it possible to reduce the risk of interference and attacks from the guest OS 41 that runs in a non-secure environment. Accordingly, with the system 1, it is possible to provide a virtualization environment that is secure and resistant to interference and attacks from outside.

On the other hand, since the hypervisor 20 running in the secure mode 2, if virtualization becomes necessary for the processing of the guest OS 41 that runs in the non-secure mode 3, this will cause a switch from the non-secure mode 3 to the secure mode 2 and a drop in the processing speed of the system 1. In this system 1, the hypervisor 20 uses the first operating condition (first configuration) 21 of the secure OS 30 that operates in the secure mode 2 and the second operating conditions (second configurations) 22a and 22c of the guest OSes, such as the non-secure OSes 41 to 43, that operate in the non-secure mode 3 to fix or limit the extent of the resources (devices) accessed by each OS to avoid duplication and reduce the frequencies or times where the hypervisor 20 has to intervene, thereby suppressing the decreasing in processing speed of the system 1.

Also, in the second configurations 22a to 22c that include the operating conditions of the guest OSes 41 to 43 that run in the non-secure mode 3, the TZ architecture 12 that is the memory protecting function is used to prohibit access to the protected region, which ensures security for memory and reduces the need for the hypervisor 20 to intervene in the non-secure mode 3. In addition, the second configurations 22a to 22c include a transition to the secure mode 2 by accessing the device that is shared with the secure OS 30, so that the hypervisor 20 that runs in the secure mode 2 can provide shared devices to the respective OSes as virtual devices.

In the system 1, the hypervisor 20 controls transition to the secure mode 2 and transition to the non-secure mode 3. The transition to the secure mode 2 may be an explicit switching instruction given to the hypervisor 20, may be trapping an access to a specified address, or may be reception of an interrupt signal from the timer unit 11t or an external hardware module. In the case of an ARM processor providing the TZ architecture 12, it is possible to use an SMC (Secure Monitor Call) as an explicit switching instruction that indicates switching to the secure mode 2.

By running the hypervisor 20 in the secure mode 2, it is possible for the secure OS 30, in particular the RTOS 30, that runs in the secure mode 2 to access shared devices via the emulation unit 27 without switching modes. In addition, in the secure mode 2, the hypervisor 20 is capable of assigning resources (devices), for example, the DMAC 11x, to the RTOS 30 by paravirtualization, which makes it possible to suppress a reduction of performance of the RTOS 30.

Figure 3:
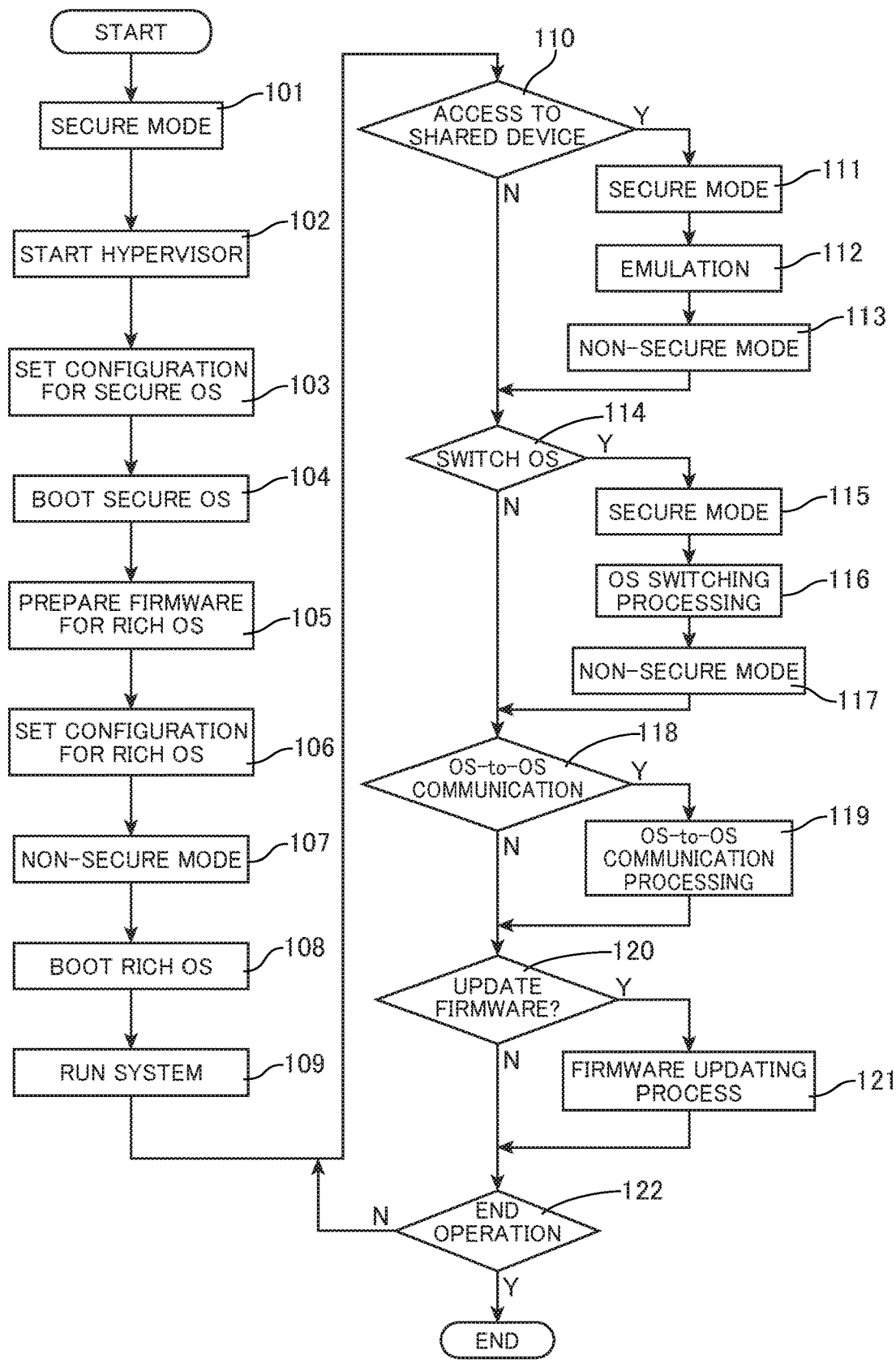
FIG. 3 is a flowchart showing a procedure that controls OSes using the hypervisor.

FIG. 3 shows, by way of a flowchart, the procedure of control (management) of a plurality of OSes by the hypervisor 20 in the system 1. When the system 1 has been started, first, in step 101, the secure mode 2 is set. Next, in step 102, the firmware (program, program product) 14h of the hypervisor stored in the boot ROM 16 of the protected region is loaded and the hypervisor 20 is started. In step 103, the hypervisor 20 sets, using the first setting unit 23, the configuration (first configuration, first operating condition) 21 for the secure OS 30 as the configuration for booting. In step 104, the boot loader of the processor unit 11 loads the firmware 14x of the secure OS that is stored in the boot ROM 16 of the protected region and launches the secure OS 30.

In step 105, the secure boot unit 50 of the hypervisor 20 prepares the firmware (instance) 14i of the non-secure rich OS 41 in the boot region 18s of the unprotected region 18b of the memory. In step 106, the hypervisor 20 sets, using the second setting unit 24a of the OS start preparing unit 25, the configuration (second configuration, second operating condition) 22a for the rich OS 41 as the configuration for booting. In step 107, the execution mode of the processor unit 11 transitions to the non-secure mode 3 and in step 108, the boot loader of the processor unit 11 loads the firmware 14i of the rich OS 41 stored in the boot region 18s in the unprotected region so as to launch the rich OS 41 in the non-secure mode 3. It is possible to start the other OSes 42 and 43 in the same way. To control (manage) the plurality of OSes 41 to 43 in the non-secure mode 3, it is possible to start a different hypervisor that runs in the non-secure mode 3 before starting the plurality of OSes 41 to 43.

When a plurality of OSes 30 and 41 to 43 are started, a state is produced where applications can run on the respective OSes and in step 109, the system 1 starts running (in operation). While the system 1 is running, when the rich OS 41 accesses a device that is shared with the secure OS 30 in step 110, the processor unit 11 transitions to the secure mode 2 in step 111. In step 112, the emulation unit 27 of the hypervisor 20 emulates (simulates) processing for the shared device and stores the result in an appropriate or predetermined unprotected region 18b in the memory to execute an access to the shared device in a virtualized environment. In step 113, the processor unit 11 transitions to the non-secure mode 3 and the rich OS 41 continues processing.

When, in step 114, a switching of OS is requested by an interrupt, scheduling, or the like, in step 115 the processor unit 11 transitions to the secure mode 2, and in step 116, the OS switching unit 26 of the hypervisor 20 carries out an OS switching process. In more detail, the state of running rich OS 41 including the context 26x that includes the content of the registers of the respective CPU cores is saved in the protected region 18a of the memory. The context 26x of the OS after switching is loaded from the protected region 18a of the memory and the contents of the registers of the respective CPU cores are rewritten. If the OS after switching is another rich OS 42, for example, in step 117, the processor unit 11 transitions to the non-secure mode 3 and another rich OS 42 is resumed (i.e., is restarted). If the OS after switching is the secure OS 30, the secure OS is resumed without performing mode switching in step 117.

In step 118, when OS-to-OS communication has become necessary, in step 119, OS-to-OS communication processing is performed using the shared region 18c set in the unprotected region 18b of the memory. This processing is described in more detail later in this specification.

In step 120, on detecting in the non-secure mode 3, via a computer network device (or "network interface") 19a or the like, that there is an update to the firmware, the rich OS 41 loads the updating data. In step 121, the updating unit 60 performs an updating process for the firmware. This processing is described in more detail later. In step 122, if the system 1 is still running, the processes described above are repeated.

Figure 4:
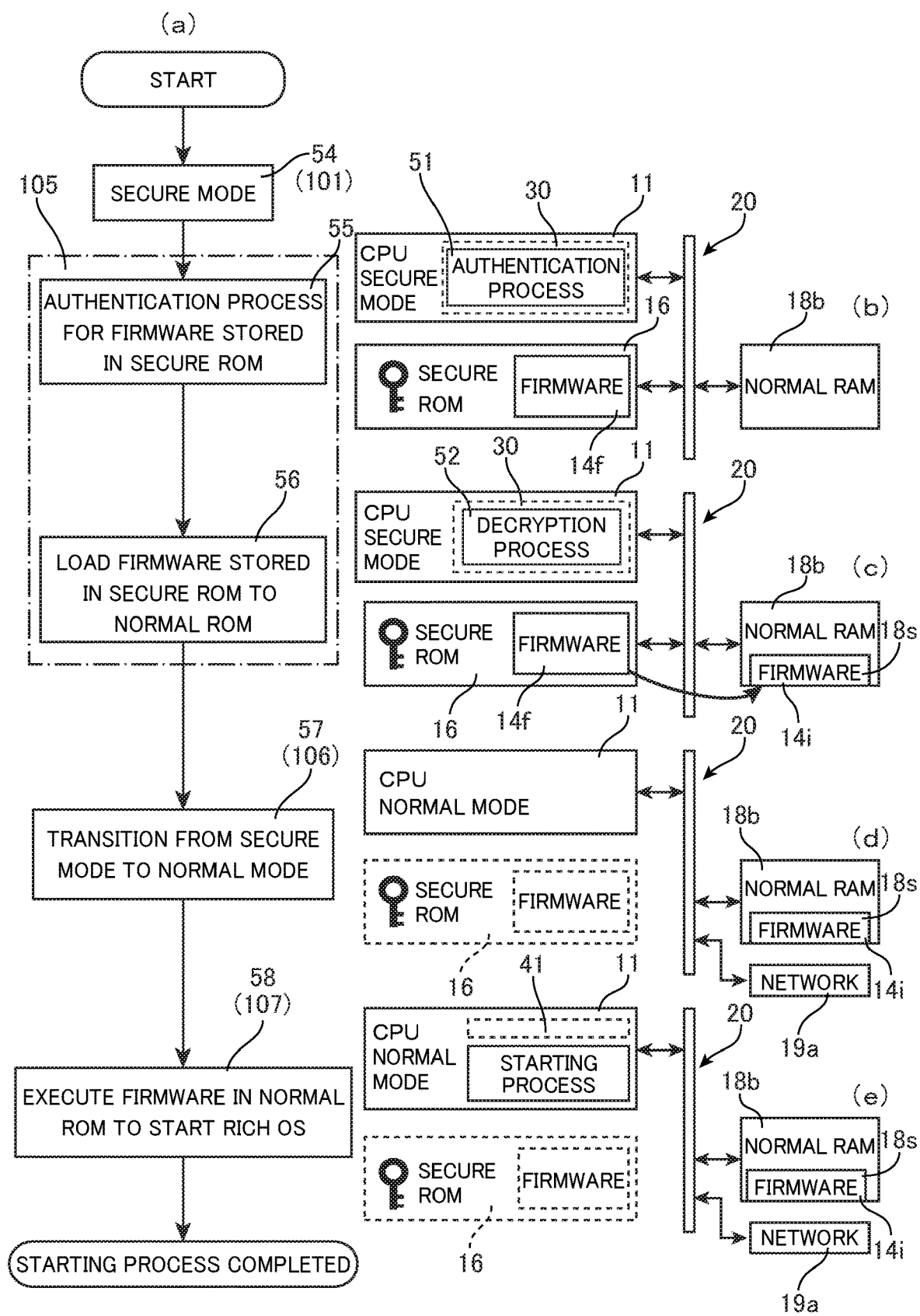
FIG. 4 depicts an overview of processing for a secure boot.

FIG. 4 shows a procedure where the secure boot unit 50 of the hypervisor 20 performs preparations for a secure booting of the second OS 41 that is rich, non-secure, and general-purpose. FIG. 4(a) depicts the starting procedure by way of a flowchart and FIGS. 4(b) to (e) schematically depict the support functions assisted (supported) by hardware, in the present embodiment how access to memory regions is permitted and limited using the TZ mechanism 12. Note that content that is the same as the starting procedure of the system 1 shown in FIG. 3 is indicated by step numbers placed in parenthesis.

In step 54, when the system 1 is started (booted), at the processor unit 11, first the secure mode 2 is set and the hypervisor 20 is started. In step 55, the authentication unit 51 of the secure boot unit 50 provided in the OS start preparing unit 25 of the hypervisor 20 that operates in the secure mode 2 uses the authentication information 15a stored in the secure key EPROM 15, which is the secure ROM in the protected region, to perform an authentication process for the firmware 14f of the second OS 41 stored in the secure boot ROM 16, which is also the secure ROM in the protected region (see FIG. 4(b)).

In step 56, the loading unit 52 of the secure boot unit 50 loads and decodes the firmware 14f that was authenticated in step 55 in the boot region 18s of the non-secure region 18b of the DDR memory 18 that is the unprotected region to form an instance 14i for executing the firmware of the second OS 41 (see FIG. 4(c)).

In step 57, the hypervisor 20 transitions the state of the processor unit 11 from the secure mode 2 to the non-secure mode (normal mode) 3. In this environment, the boot ROM 16 cannot be seen and can no longer be accessed, but access to the normal RAM 18b and the network 19a becomes possible (see FIG. 4(d)).

In step 58, a starting process (booting) of the second OS 41 is performed. The instance 14i for executing the firmware of the second OS 41 formed in the normal RAM 18b is loaded by the boot loader of the processor unit 11 to start the OS 41 (see FIG. 4(e)). The second OS 41 is launched and run in an environment defined by the second configuration 22a that has been set as the boot configuration by the second setting unit 24a of the hypervisor 20. Accordingly, it is possible to access the normal RAM 18b and the network 19a, which are capable of being accessed in the second configuration 22a, from the second OS 41 and the client applications 45 that run on the second OS 41. On the other hand, since the system 1 is running in the normal mode (non-secure mode) 3, the boot ROM 16 cannot be seen and cannot be accessed due to the TZ architecture (TZ mechanism) 12. This means that the boot ROM 16 storing the firmware 14f for starting the second OS 41 cannot be seen or written into from an environment managed by the non-secure OS 41. Accordingly, it is not possible for the application group 45 that runs on the second OS 41 to attack or modify the firmware 14f, which makes it possible to maintain security over the second OS 41.

Figure 5:
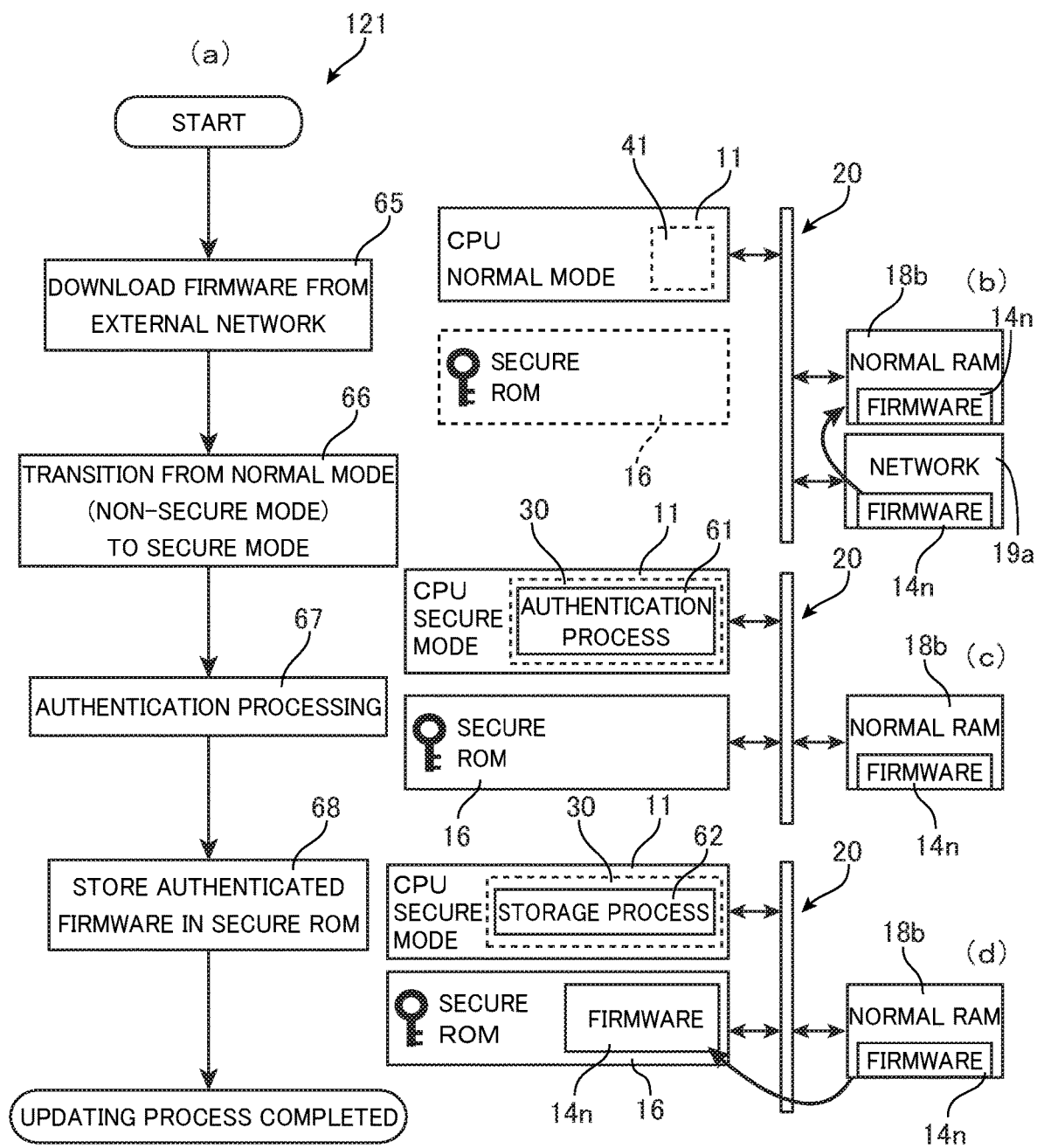
FIG. 5 depicts an overview of processing for a secure update.

FIG. 5 shows how the updating unit 60 included in the hypervisor 20 performs in the secure mode 2 securely updating of the general-purpose and rich second OS 41. The updating unit 60 may be provided as an application that runs on the secure OS 30. FIG. 5(a) is a flowchart depicting the updating process 121 depicted in FIG. 3 in more detail, and FIGS. 5(b) to (d) schematically depict a support function that is supported by hardware and protects memory during the updating process, in the present embodiment, permitting and limiting access to a memory region using the TZ mechanism 12.

Step 65 is a process executed in the normal mode (non-secure mode) 3. When an external network has been accessed from the network interface 19a and there is firmware 14n for updating purposes for the second OS 41, the second OS (non-secure OS) that runs on the processor unit 11 in the normal mode downloads the firmware 14n for updating purposes into the normal RAM 18b. In this execution environment, due to the TZ mechanism 12, the boot ROM 16 cannot be seen from the second OS 41 so that the second ROM 16 is not exposed to attack from outside (see FIG. 5(b)).

Then, at appropriate timing, as examples, when the system 1 is started, when the system 1 is shut down, and when the execution mode of the processor unit 11 switches to the secure mode 2 requested by another factor (step 66), the hypervisor 20 runs in the secure mode 2, and in step 67, the authentication unit 61 of the updating unit 60 authenticates the firmware 14n that has been downloaded into the normal RAM 18b using the authentication information 15b stored in the secure key EPROM 15 of the protected region (see FIG. 5(c)).

When the firmware 14n for updating purposes in the normal RAM 18b has been authenticated, in step 68, the storage unit 62 of the updating unit 60 stores the firmware 14n for updating purposes in the normal RAM 18b into the boot ROM 16 that is a secure ROM and, if necessary, the firmware 14f stored in the secure boot ROM 16 is replaced with the updated firmware 14n (see FIG. 5(d)). Also, if necessary, the firmware 14n for updating purposes downloaded into the normal RAM 18b is discarded.

Since the updating unit 60 runs in the secure mode 2, the updating unit 60 is separated from non-secure and rich second OS 41 running in the normal mode 3, which means that attacks to the updating unit 60 are prohibited from non-secure devices, such as thought networks on which security has not been established. By authenticating the downloaded firmware 14n using the authentication information 15b stored in the secure key EPROM 15 that is the protected region that is not accessed in the non-secure mode 3, content that has been illegally modified can be excluded. Accordingly, with the updating unit 60, it is possible to prevent the secure memory region from being polluted with malicious content or the like. This means that it is possible to securely update the firmware of the second OS 41 stored in the secure boot ROM 16 that is a protected region, and after this to securely start the second OS 41 using the secure boot unit 50 described above.

Figure 6:
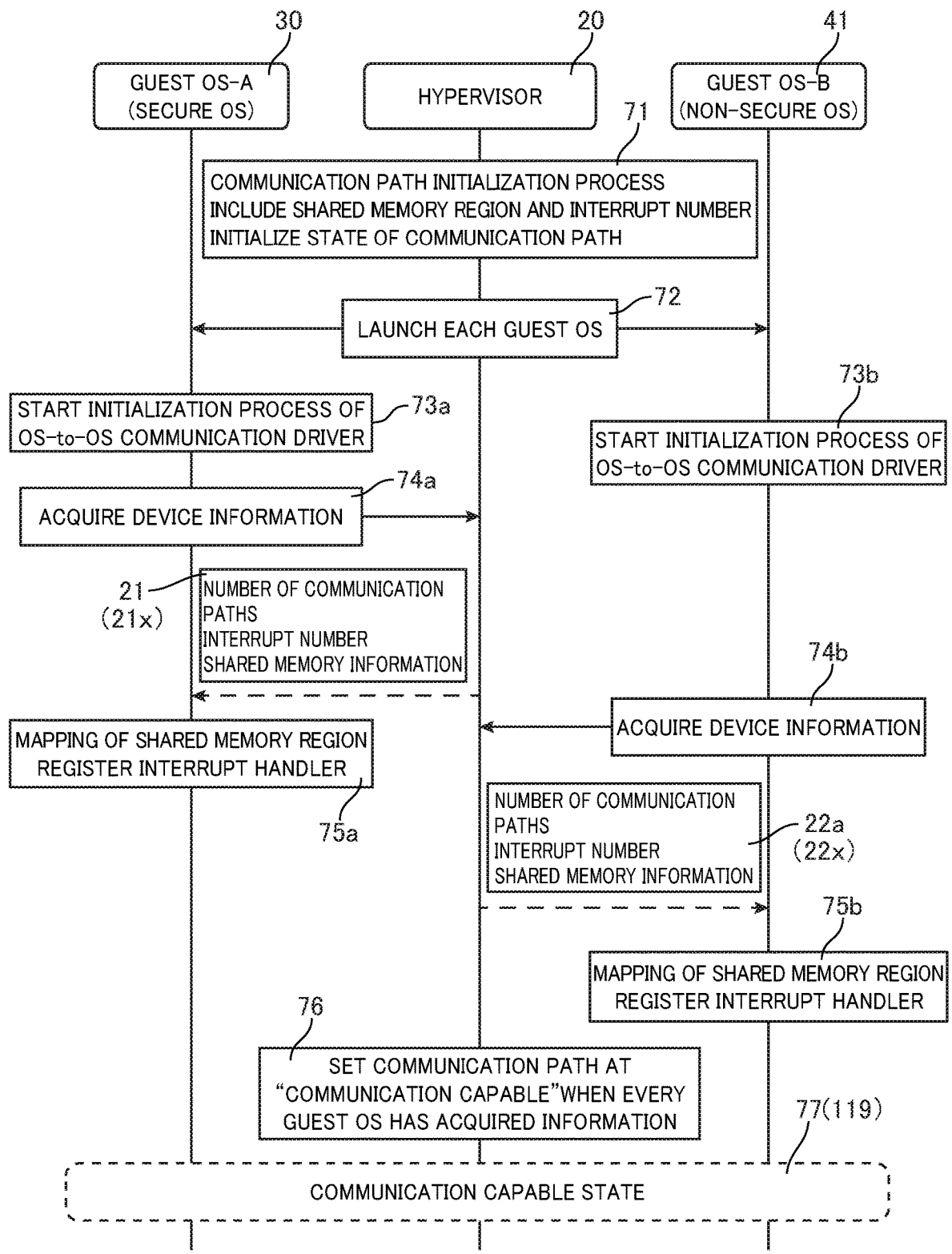
FIG. 6 depicts a setting procedure for performing OS-to-OS communication.

FIG. 6 shows the procedure for executing an OS-to-OS communication process 119 by way of a timing chart. Although an example where two OSes, the secure OS 30 and the non-secure OS 41, are started at substantially the same time is imagined, the OSes may be started at different times. In the processing depicted in FIG. 6, reference is made to the operation conditions 21x and 22x for a shared memory region that are included in the respective configurations 21 and 22a of the OS 30 and the OS 41 and the OS-to-OS communication is performed via the shared region 18c set in the unprotected region.

In the system 1 in which the plurality of OSes can run in environments that are virtualized by the hypervisor 20, real-time response in a multi OS environment is demanded, making it necessary to implement efficient OS-to-OS communication (inter-OSes communication). One example of OS-to-OS communication executed via the hypervisor 20 is where the hypervisor 20 performs arbitration for all the processing. The hypervisor 20 in the present embodiment can support this type of OS-to-OS communication on a processing level. The basic functions that are necessary to realize OS-to-OS communication are as follows.

data transmission processing
data reception processing
data reception notification processing
notification of data transmission completion In an arrangement where the hypervisor 20 arbitrates all the processing, the transmission of data is executed by an OS that is currently running, for example, a guest OSa, autonomously calling the hypervisor 20. The hypervisor 20 that has received transmission data copies the transmission data into a reception region of another OS, for example a guest OSb, that is a transmission destination that is managed by the hypervisor 20 itself. Notification of data reception is executed inside the hypervisor 20 after completion of the data transmission processing, with notification being realized by having the guest OSb that is the transmission destination issue a dedicated interrupt. In the data reception processing, the guest OSb that has recognized the reception of data in the form of an interrupt signal requests the hypervisor 20 to acquire reception data. At this time, the hypervisor 20 copies (reads out and writes) the reception data into a memory region of the guest OSb that issued the request. When the guest OSb that is the transmission destination has received the data, the hypervisor 20 notifies the guest OSa that is the transmission source of a transmission completion event. In the same way as notification of data reception, this reception uses an interrupt signal to notify the guest OSa. On receiving this notification, the guest OSa that is the transmission source recognizes that it is now possible to transmit the next data.

In this OS-to-OS communication process, while the hypervisor 20 is executing the communication process that was requested from a guest OS, the guest OS that requested the communication enters a stopped state until the processing by the hypervisor 20 is completed. This is an unavoidable situation on a configuration where the guest OS and the hypervisor 20 are executed on the same processor. The guest OS enters the stopped state for several tens of microseconds, which does not constitute much of a problem when the guest OS is Linux (registered trademark) or Android. However, this is expected to be problematic when a real-time OS (or "RTOS") is being executed as the guest OS. Also, since the hypervisor 20 runs in the secure mode 2, when communication is to be performed between the guest OSes 41 and 42 on the non-secure mode 3 or between the non-secure OS 41 on the non-secure mode 3 and the secure OS 30 on the secure mode 2, it is necessary to switch the execution mode of the processor unit 11 between secure and non-secure, which results in the risk of increasing the stopping-time (downtime) for the OSes involved in the OS-to-OS communication.

A typical RTOS is a system where it is necessary to execute related processing within a certain time of an event occurring, with control of machinery as the main application. For the control system that has severe time or response requirements, stopping for several tens of microseconds is highly likely to pose a fatal problem. For the example of machine control, if an event that makes an emergency stop of the machinery necessary occurs during execution of OS-to-OS communication processing, until the OS-to-OS communication is completed, it will not be possible for the RTOS to execute emergency stop processing.

In the system 1, by setting a shared memory for communication between guest OSes by the hypervisor 20, it is possible to provide the OS-to-OS communication function where the guest OSes do not stop or where the stopped time is reduced. On this OS-to-OS communication function, intervention or operation of the hypervisor 20 is limited as far as possible. When starting the OSes, the hypervisor 20 intervenes to execute arbitration between the OSes and/or an initialization process, and during the OS-to-OS communication process, most of the processing is executed by only the OSes (the guest OSes) that have been started, with intermediation by the hypervisor 20 being avoided as much as possible. When starting the OSes, although the guest OSes enter stopped states due to intermediation by the hypervisor 20, such states are before the system 1 enters an operating state or before the corresponding OSes enter operating states and so does not constitute a problem.

By excluding intervention of the hypervisor 20 into the OS-to-OS communication, the majority of the OS-to-OS communication processing is executed under control by the guest OSes. By doing so, when an urgent situation occurs for an RTOS during OS-to-OS communication, the RTOS can suspend the OS-to-OS communication processing promptly and execute emergency processing.

In this system 1, information (including mapping information) of the shared region 18c for setting to perform the OS-to-OS communication can be included in the operation conditions 21x and 22x of the configurations 21 and 22a to 22c for starting the respective OSes 30 and 41 to 43. The hypervisor 20 can executes start preparation and assigning (mapping) the region when starting the OSes 30 and 41 to 43. The shared memory region 18c may be set in advance by the hypervisor 20, and the hypervisor 20 may include information that has been set by any of the OSes in the configuration 21 or any of 22a to 22c to enable use by another OS.

By using the shared memory region 18c as a transmission/reception region to be used by the OS-to-OS communication processing, aside from the initial settings, it is possible to exclude or minimize intervention or mediation by the hypervisor 20 in the communication processing between OSes that both run in the non-secure mode 3 and between OSes that both run in the secure mode 2. For communication between a second OS that runs in the non-secure mode 3 such as the non-secure OS 41, and the secure OS 30 that runs in the secure mode 2, although the hypervisor 20 is involved in notification from the non-secure side to the secure side, it is possible to exclude or minimize other intermediation by the hypervisor 20.

FIG. 6 shows, for a case where the hypervisor 20 has prepared the shared memory region 18c, a procedure that makes settings for OS-to-OS communication as part of a process that starts guest OSes. As examples, the guest OSes are the secure OS (RTOS) 30 that operates in the secure mode 2 and the non-secure OS 41 that operates in the non-secure mode 3. By setting the shared memory region 18c in a non-secure memory region (unprotected region) 18b, since it is possible for both OSes, that is, the OS 30 that operates in the secure mode 2 and the non-secure OS 41 that operates in the non-secure mode 3 to access the shared memory region 18c, it is possible to realize inter-OSes communication with favorable real-time response.

The hypervisor 20 performs an initialization process for a communication path in step 71. In this initialization process, the shared memory region 18c and the interrupt number used in the OS-to-OS communication are included and the communication path state is initialized. Next, in step 72, the respective guest OSes, in this example, the secure OS 30 and the non-secure OS 41, are started. These OSes may be launched at the same time or may be launched in order.

At the secure OS 30, in step 73a, the initialization process of the OS-to-OS communication driver 36x starts. In step 74a, the secure OS 30 acquires device information during booting, provides the device information to the hypervisor 20, and receives the configuration (first configuration) 21 that includes shared memory region information from the hypervisor 20. In step 75a, settings of the device driver 36, which include mapping of the shared memory region and registration of an interrupt handler, are made and operation of the secure OS 30 starts.

The same process is applied to the non-secure OS 41. In step 73b, an initialization process of the OS-to-OS communication driver 46x starts. In step 74b, the device information is acquired and provided to the hypervisor 20, and the configuration (second configuration) 22a that includes shared memory region information is received from the hypervisor 20. In step 75b, settings of the device driver 46, which include mapping of the shared memory region and registration of an interrupt handler, are made and operation of the non-secure OS 41 starts. However, in this case, the non-secure OS 41 needs to output a notification to the secure OS 30 that runs in the secure mode 2. Accordingly, in step 75b, settings are made so that a notification is outputted to the secure OS 30 via the hypervisor 20.

In step 76, the hypervisor 20 sets a communication path into a communication capable state at a time when every guest OS has acquired information relating to the OS-to-OS communication. By doing so, aside from when a notification is given from the non-secure OS 41 to the secure OS 30, OS-to-OS communication processing is thereafter performed between the secure OS 30 and the non-secure OS 41 (step 77) without the hypervisor 20 being involved. For the communication between the non-secure OSes 41 and 42, the communication is performed without the hypervisor 20 being involved.

The shared memory region 18c can be referenced from the secure OS 30 and the non-secure OS 41 that are communicating, so that the secure OS 30 and the non-secure OS 41 can access directly to transmission/reception data from each other. By doing so, compared to the inter-OS communication processing where the hypervisor 20 intervenes in processes including data transfer (data input/output), the secure OS 30 and the non-secure OS 41 can respectively input/output of data directly during the OS-to-OS communication and can implement such processing part in each OS. The hypervisor 20 has a role of providing information relating to the shared region 18c to the secure OS 30 and the non-secure OS 41 during the initialization process and of reserving and constructing the shared memory region.

In the OS-to-OS communication processing, the secure OS 30 and the non-secure OS 41 execute transmission/reception processes for data and then give notifications of the data reception and transmission completion to the other OS to be communicating with. Notifications from the secure OS 30 to the non-secure OS 41 use the interrupt signal 36q. Accordingly, the secure OS (RTOS) 30 can continues processing without waiting the end of process of the hypervisor 20 and without stopping during the OS-to-OS communication processing.

On the other hand, for notifications from the non-secure OS 41 to the secure OS 30, since it is necessary to transition from the non-secure mode 3 to the secure mode 2, the OS-to-OS communication unit 28 of the hypervisor 20 is involved. Accordingly, although the processing of the non-secure OS 41 is stopped during this period, as described earlier, the non-secure OS 41 usually can accept such stopping for around several tens of microseconds. Also, for communication between the OSes 41 and 42 that run in the non-secure mode 3, by directly controlling the interrupt controllers of the respective OSes, it is possible to exclude intermediation of the hypervisor 20. The hypervisor 20 has a role of including the operation conditions 21x and 22x of the shared memory in the configurations 21 and 22a to 22c, setting interrupts to be used for notifications given in inter-OS communication for the OSes 30 and 41 to 43, and notifying the OSes 30 and 41 to 43 of such information.

Figure 7:
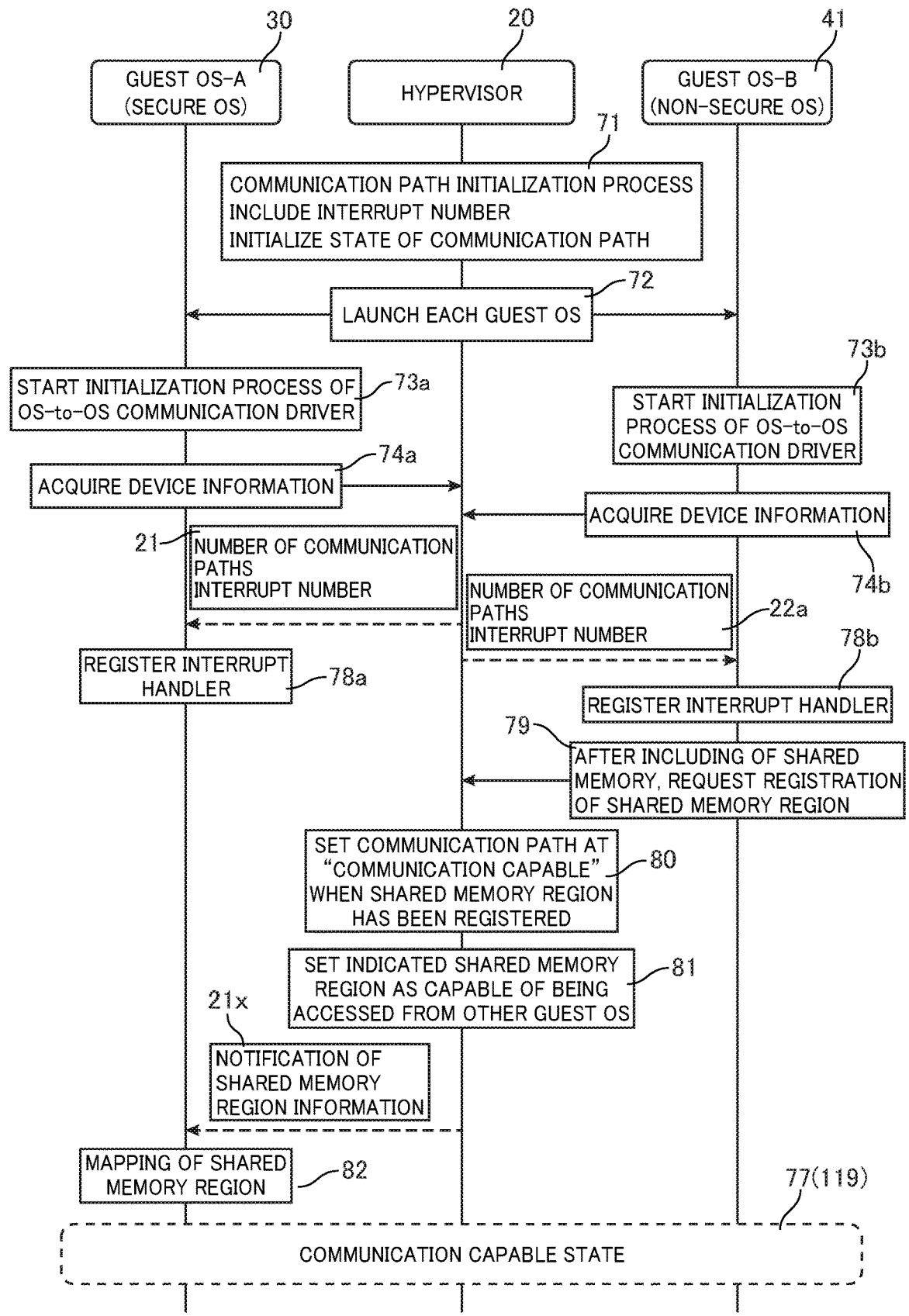
FIG. 7 depicts a different example of a setting procedure for performing OS-to-OS communication.

FIG. 7 shows a case where the guest OS prepares the shared memory region 18c. In this example, the non-secure OS 41 that runs in the non-secure mode 3 prepares the shared memory region 18c and the hypervisor 20 passes information on the shared memory region 18c over to the secure OS 30 to start the OS-to-OS communication.

As same as the processing depicted in FIG. 6, the hypervisor 20 prepares for start of the secure OS 30 and the non-secure OS 41 and provides the configurations 21 and 22a, but information on the shared memory region is not included in the configurations 21 and 22a of initially set at the starting. The non-secure OS 41 sets the device driver 46 based on the configuration 22a and also registers an interrupt handler (step 78b). In addition, in step 79, after including the shared memory region 18c, the hypervisor 20 is requested to register the shared memory region 18c for use in OS-to-OS communication.

In step 80, the hypervisor 20 registers the shared memory region 18c and sets the communication path to be capable of communication. Also, in step 81, the shared memory region 18c that has been indicated by the non-secure OS 41 is set so as to be capable of being accessed from the secure OS 30 as another guest OS. That is, the secure OS 30 is notified of the information 21x of the shared memory region.

The secure OS 30 makes settings of a device driver including an interrupt handler according to the configuration 21 provided from the hypervisor 20 (step 78a). In addition, when information 21x on the shared memory region has been provided from the hypervisor 20, in step 82, the shared memory region 18c is mapped to enable OS-to-OS communication that uses the shared memory region 18c. Then, OS-to-OS communication between the OSes becomes possible (step 77).

As described earlier, for communication between guest OSes that run in the non-secure mode 3, interrupt controllers are directly controlled. For communication between the OS 30 that runs in the secure mode 2 and the OS 41 that runs in the non-secure mode 3, from the viewpoint of security, the hypervisor 20 is merely requested to perform a notification process from the OS 41 in the non-secure mode 3 to the OS 30 in the secure mode 2, which makes it possible to reduce the processing time required for OS-to-OS communication without sacrificing security.

Although the processor 11 that has an embedded TZ architecture to support a secure environment has been described above as an example, it is possible to realize secure booting and secure updating in the same way for a processor with an embedded VZ architecture or VT architecture. For a VZ architecture or a VT architecture, the root mode state corresponds to the secure mode state and the guest mode state corresponds to the normal mode (non-secure mode) state.

The RTOS 30 is one example of an OS that operates in a secure environment, a rich OS such as Linux (registered trademark) may operate in a secure environment, or another embedded OS, for example, a multitasking embedded operating system with an event-driven or non-preemptive scheduler may operate in a secure environment.

As described above, the hypervisor 20 included in the system 1 includes a first operating condition (first configuration) for starting the OS 30 in the secure environment and a second operating condition (second configuration) for starting the OS 41 to 43 in the non-secure environment(s) and is a bare metal-type hypervisor that can control the plurality of OSes on the different environments. The hypervisor 20 is compact and can be realized with an extremely low load of around 1% or below for the CPU to operate the hypervisor 20, so that the usage efficiency of the CPU (processing unit, processor) with hypervisor 20 is favorable. Accordingly, a system equipped with the hypervisor 20, in particular an embedded system such as a SoC, is capable of running a variety of client applications 45 in a secure environment, even for a system that uses a CPU with not especially high performance. This means that with the embedded system 1 including the hypervisor 20, it is possible to inexpensively provide a secure environment on a variety of apparatuses controlled by client applications 45, as examples, smart home appliances, healthcare applications, HEMS, smart meters, and consumer peripherals such as printers, as well as apparatuses for in-car computing.

The invention claimed is:

1. A system comprising:
a hardware processor including a memory protecting architecture that is configured to prohibit access to a protected region of a memory, wherein the memory includes the protected region and an unprotected region, and the processor being equipped with execution modes including a low security mode in which access to the protected region is prohibited by the memory protecting architecture and a secure mode in which access to the protected region is permitted; and
a hypervisor that runs in the secure mode of the processor,
wherein the hypervisor sets a first operating condition enabling a first OS running in the secure mode to access the protected region and the unprotected region; and
the hypervisor sets a second operating condition enabling a second OS running in the low security mode to access the unprotected region, disabling the second OS from accessing the protected region by using the memory protecting architecture, and enabling a transition to the secure mode by trapping access of the second OS to a first device shared with the first OS using the memory protecting architecture; and
an emulator that is configured to provide the first device to the second OS through virtualization,
wherein the first operating condition and the second operating condition include an operating condition of a shared memory region set in the unprotected region, the operating condition of the shared memory region including a transition to the secure mode when the second OS writes into the shared memory region, and
the hypervisor notifies the first OS of a write into the shared memory region, and
the first OS notifies, by way of an interrupt, the second OS of a write into the shared memory region.

2. The system according to claim 1,
wherein the first operating condition includes disabling access to an unprotected device including a network interface device for a low security computer network and the second operating condition includes enabling access to the unprotected device.

3. The system according to claim 1,
wherein the hypervisor includes an OS switching that is configured to switch between a plurality of OSes including the first OS and the second OS, and wherein the OS switching stores operating conditions of the plurality of OSes and contexts of the plurality of OSes in the protected region.

4. The system according to claim 1,
wherein the OS start preparation is further configured to authenticate firmware of the second OS stored in the protected region using authentication information stored in the protected region; and load the firmware of the authenticated second OS stored in the protected region as an instance for execution purposes in a boot region of the unprotected region.

5. The system according to claim 4,
wherein the OS start preparation is further configured to, in the secure mode, authenticate firmware for updating purposes that has been downloaded into the unprotected region using the authentication information stored in the protected region; and store the authenticated firmware for updating purposes that was downloaded into the unprotected region into the protected region.

6. The system according to claim 1, further comprising a system on chip on which the memory and the processor are mounted.

7. The system according to of claim 1, further comprising:
an application that runs on the second OS;
and an apparatus that is controlled by the application.

8. A method of controlling a plurality of OSes in a system including a processing unit that includes a support function that is configured to prohibit access to a protected region of a memory, wherein the memory includes the protected region and an unprotected region, and the processor being equipped with execution modes including a low security mode in which access to the protected region is prohibited by the support function and a secure mode in which access to the protected region is permitted,
wherein the system also includes a hypervisor that runs in the secure mode of the processing unit, and
the method comprises:
setting, using the hypervisor, a first operating condition that includes enabling a first OS running in the secure mode to access the protected region and the unprotected region;
setting a second operating condition that includes enabling a second OS running in the low security mode to access the unprotected region, disabling the second OS from accessing the protected region by using the support function, and enabling a transition to the secure mode by an accessing of the second OS to a first device shared with the first OS; and
providing the first device to the second OS through virtualization,
wherein the first operating condition and the second operating condition include an operating condition of a shared memory region set in the unprotected region, and
the method further comprises:
transitioning to the secure mode when the second OS writes into the shared memory region and notifying, using the hypervisor, the first OS of a write into the shared memory region; and
notifying, using the first OS, by way of an interrupt, the second OS of a write into the shared memory region.

9. The method according to claim 8,
further comprising switching, using the hypervisor, between a plurality of OSes including the first OS and the second OS, and wherein
the switching includes storing operating conditions of the plurality of OSes and contexts of the plurality of OSes in the protected region.

10. The method according to claim 8,
further comprising preparing, using the hypervisor, for starting an OS,
wherein the preparing includes:
authenticating firmware of the second OS stored in the protected region using authentication information stored in the protected region; and
loading the authenticated firmware of the second OS stored in the protected region as an instance for execution purposes in a boot region of the unprotected region.

11. The method according to claim 10,
wherein the system further includes an updating unit that runs in the secure mode, and
the method further comprises:
authenticating, using the updating unit, firmware for updating purposes that has been downloaded into the unprotected region using the authentication information stored in the protected region; and
storing the authenticated firmware for updating purposes that was downloaded into the unprotected region into the protected region.

12. A non-transitory computer readable medium with a program product executed by a system that enables control of a plurality of OSes in the system including a processing unit that includes a support function that is configured to prohibit access to a protected region of a memory, wherein the memory including the protected region and an unprotected region, and the processor being equipped with execution modes including a low security mode in which access to the protected region is prohibited by the support function and a secure mode in which access to the protected region is permitted,
the program product comprising an instruction that causes the processing unit to run a hypervisor in the secure mode, wherein the hypervisor executing:
setting of a first operating condition that includes enabling a first OS running in the secure mode to access the protected region and the unprotected region;
setting of a second operating condition that includes enabling a second OS running in the low security mode to access the unprotected region, disabling the second OS from accessing the protected region by using the support function, and enabling a transition to the secure mode by an accessing of the second OS to a first device shared with the first OS; and
providing the first device to the second OS through virtualization,
wherein the first operating condition and the second operating condition include an operating condition of a shared memory region set in the unprotected region, and
the hypervisor further comprises:
transitioning to the secure mode when the second OS writes into the shared memory region and notifying, using the hypervisor, the first OS of a write into the shared memory region; and
notifying, using the first OS, by way of an interrupt, the second OS of a write into the shared memory region.

* * * * *